(12) United States Patent
Krall

(10) Patent No.: US 7,104,647 B2
(45) Date of Patent: Sep. 12, 2006

(54) MULTI-FOCAL OPHTHALMIC LENS WITH BASE IN PRISM

(76) Inventor: Jeffrey P. Krall, 1415 N. Sanborn Blvd., Mitchell, SD (US) 57301

( * ) Notice: Subject to any disclaimer, the term of this patent is extended or adjusted under 35 U.S.C. 154(b) by 0 days.

(21) Appl. No.: 11/078,891

(22) Filed: Mar. 10, 2005

(65) Prior Publication Data

US 2006/0170863 A1 Aug. 3, 2006

Related U.S. Application Data

(60) Provisional application No. 60/649,487, filed on Feb. 3, 2005.

(51) Int. Cl.
*G02C 7/06* (2006.01)
(52) U.S. Cl. ..................... 351/170; 351/168
(58) Field of Classification Search ................. 351/170
See application file for complete search history.

(56) References Cited

U.S. PATENT DOCUMENTS

| | | | |
|---|---|---|---|
| 4,961,639 A | 10/1990 | Lazarus | |
| 5,200,859 A | 4/1993 | Payner et al. | |
| 5,381,191 A | 1/1995 | Levy | |
| 5,557,348 A * | 9/1996 | Umeda et al. | 351/169 |
| 5,782,894 A | 7/1998 | Israel | |
| 5,969,790 A | 10/1999 | Onufryk | |
| 6,019,470 A * | 2/2000 | Mukaiyama et al. | 351/169 |
| 6,062,691 A | 5/2000 | Markson | |
| 6,347,869 B1 | 2/2002 | Xu et al. | |
| 6,505,934 B1 | 1/2003 | Menezes | |
| 6,547,387 B1 | 4/2003 | Katsantones | |
| 6,579,478 B1 | 6/2003 | Lossman et al. | |

* cited by examiner

*Primary Examiner*—Darryl J. Collins
(74) *Attorney, Agent, or Firm*—Wood, Phillips, Katz, Clark & Mortimer

(57) ABSTRACT

A pair of glasses comprises a frame. A first progressive addition lens in the frame comprises a distance portion and a near portion. Diopter power and base in prism gradually increase from the distance portion to the near portion. A second progressive addition lens in the frame comprises a distance portion and a near portion. Diopter power and base in prism gradually increase from the distance portion to the near portion. Base in prism in the first lens may be different from in the second lens. Amount of base in prism may vary in a range of about 0 to 1.5 diopters.

21 Claims, 3 Drawing Sheets

MULTI-FOCAL OPHTHALMIC LENS WITH BASE IN PRISM

PRIORITY

This application claims priority of provisional application No. 60/649,487, filed Feb. 3, 2005.

FIELD OF THE INVENTION

This invention relates to multifocal ophthalmic lenses with base in prism.

BACKGROUND OF THE INVENTION

With normal vision, an individual is able to change focus for different distances. Ideally, an individual is able to focus on distant objects, referred to as distance vision, and on near objects, referred to as near vision. The optical system of the eye uses numerous muscles to focus for both distance and near vision. These muscles allow the eye to adjust focus when transitioning between distance vision and near vision. There are various responses involved in changing focus from distance vision to near vision. These include making the image clearer, the eyes turning in or out, and pupils changing size. If the eyes do not turn in enough with near vision, for example, then the individual would see double.

Presbyopia is a natural deterioration of near vision caused by loss of flexibility in the eye's lenses as one ages. This can be compensated by wearing "reading" glasses having lenses which correct refraction errors so that the eye does not have to focus as much. Often with presbyopia, the person does not need distance correction, but rather only near correction. To avoid continually taking the eyeglasses on and off, bifocals may be used. Bifocals enable the person to see at different distances. Particularly, bifocals are generally used when the eye can no longer correctly change focus from distance to near. Progressive addition lenses (PALs) include a distance portion and a smooth, graduating, continuous change in dioptic power to a near portion. PALs have no lines or edges visible between changes in dioptic power.

When a person transitions from looking through the distance portion to the near portion with bifocal lenses, the eyes do not need to focus to the same extent, because of the increase in dioptic power, as without the bifocals. As a result, there is a decrease in accommodative convergence, meaning that the eyes do not try to converge as much. This results in eye strain because the eyes subsequently use additional fusional convergence to converge for near.

The present invention is directed to solving one or more of the problems discussed above, in a novel and simple manner.

SUMMARY OF THE INVENTION

In accordance with the invention, there is provided a multifocal ophthalmic lens including base in prism.

There is disclosed in accordance with one aspect of the invention an improvement in a progressive addition lens comprising a distance portion and a near portion, wherein diopter power gradually increases from the distance portion to the near portion. The improvement comprises base in prism in the lens, wherein the amount of base in prism increases from the distance portion to the near portion.

It is a feature of the invention that base in prism varies in a range from about 0 to 1.5 diopters.

It is another feature of the invention that base in prism is induced by changing thickness of the lens in different amounts from the distance portion to the near portion.

It is still another feature of the invention that base in prism is induced by de-centering optical center of the lens in different amounts from the distance portion to the near portion.

There is disclosed in accordance with another aspect of the invention a progressive lens comprising a distance portion, an intermediate portion and a near portion. Diopter power and base in prism continually change in the intermediate portion between the distance portion and the near portion.

There is disclosed in accordance with another aspect of the invention a pair of glasses comprising a frame. A first progressive addition lens in the frame comprises a distance portion and a near portion. Diopter power and base in prism gradually increase from the distance portion to the near portion. A second progressive addition lens in the frame comprises a distance portion and a near portion. Diopter power and base in prism gradually increase from the distance portion to the near portion.

It is a feature of the invention that base in prism in the first lens is different from in the second lens.

There is disclosed in accordance with yet another aspect of the invention a progressive addition lens comprising a distance portion, an intermediate portion and a near portion. Diopter power continually changes in the intermediate portion between the distance portion and the near portion. Base in prism is greater in the near portion than in the distance portion.

There is disclosed in accordance with still a further aspect of the invention a bifocal lens comprising a distance portion and a near portion. Diopter power is greater in the near portion than in the distance portion. Base in prism is greater in the near portion than in the distance portion.

Further features and advantages of the invention will be readily apparent from the specification and from the drawings.

DETAILED DESCRIPTION OF THE INVENTION

The present invention relates to use of base in prism added to multifocal ophthalmic lenses to reduce visual demand to converge at near vision. The added base in prism allows the person to have reduced need to converge when looking through the portion of the lens designed to aid in near vision. Particularly, the amount of prismatic effect is varied from distance correction to near correction.

In accordance with the invention, a continuous change in add power of a progressive addition lens from a distance portion to a near portion is supplemented with increasing base in prism from the distance portion to the near portion. This reduces the need for the eyes to converge at near, therefore reducing eye strain. The amount of base in prism will vary depending on the add power and the desired amount of decreased convergence needed but will likely always be equal to or greater than 0.50 diopters per lens. In an exemplary embodiment of the invention the amount of base in prism varies in a range of about 0 to 1.5 diopters per lens, but the range could be larger such as on the order of 0 to 3 diopters.

Figure 1:
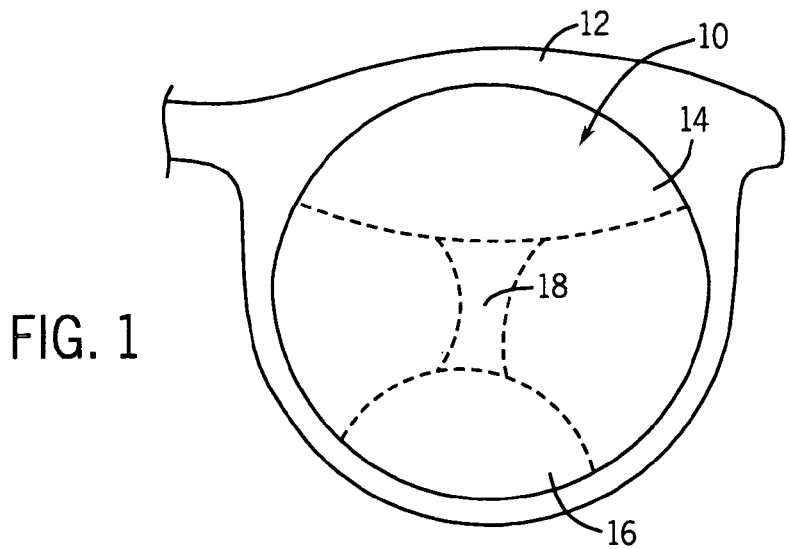
FIG. 1 is a partial, front elevation view of eyeglasses in accordance with the invention including a multifocal ophthalmic lens in the form of a progressive addition lens in accordance with the invention.

A progressive addition lens is one that has at least one progressive addition surface which could be placed on either or both sides of the lens or within the lens itself. Referring to FIG. 1, a progressive additional lens 10 is illustrated in a frame 12. The lens 10 is illustrated with dashed lines to separate different portions of the lens 10. Particularly, a distance portion 14 is separated from a near portion 16 by an intermediate portion 18. The different portions are defined by a progressive surface which is an aspheric surface in which the distance portion 14 and near portion 16 are connected by a smooth and continuous changing increasing dioptic power in the intermediate portion 18 from the distance portion 14 to the near portion 16. A distance vision correction amount, expressed in diopters, is used in the distance portion 14. "Add power" is the amount of dioptic power difference added to the distance correction in the near portion 16 and the intermediate portion 18. In accordance with the invention, base in prism is added to the lens 10. Base in prism is the bending of light in which the image is displaced towards the apex. In accordance with the invention, base in prism is greater in the near portion 16 than in the distance portion. Also, base in prism gradually increases in the intermediate portion 18 between the distance portion 14 and the near portion 16.

Figure 2:
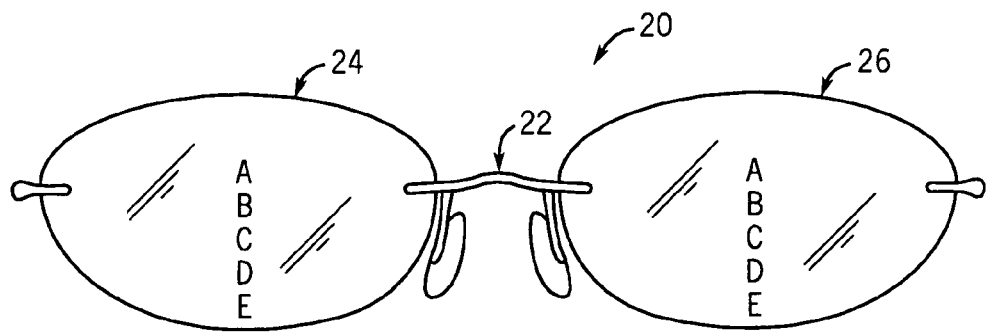
FIG. 2 is a front elevation view of eyeglasses including progressive addition lenses in accordance with the prior art.

Referring to FIG. 2, a prior art pair of glasses 20 comprises a frame 22 supporting a first progressive addition lens 24 and a second progressive addition lens 26. As is known, each lens can have a base diopter power used for any necessary distance correction. The locations referenced as A, B, C, D and E represent add power and horizontal prism provided by the progressive surface as follows:

| Location | Add Power | Horizontal prism |
|----------|-----------|------------------|
| A | +0.00 | negligible |
| B | +0.50 | negligible |
| C | +1.00 | negligible |
| D | +1.50 | negligible |
| E | +2.00 | negligible |

Figure 3:
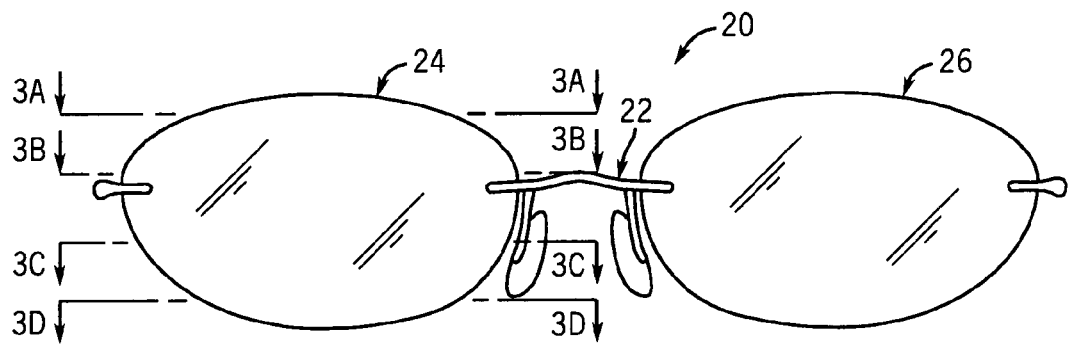
FIG. 3 is a front elevation view similar to FIG. 2 with section lines schematically illustrating lens configuration in the section views FIGS. 3A–3D.
Figure 3A:
Figure 3B:
Figure 3C:
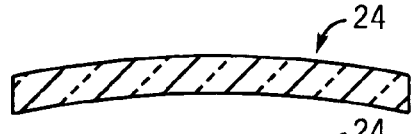
Figure 3D:
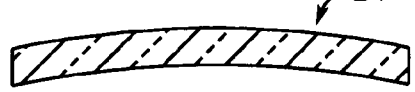

FIG. 3 illustrates the same glasses 20 as in FIG. 3 and provides cross-section lines for FIGS. 3A, 3B, 3C and 3D schematically illustrating that there is no additional base in prism added to the lens as the bifocal add power of the lens changes. This is schematically illustrated by the cross sections showing uniform lens thickness.

In a progressive addition lens in one form, the front surface of the lens is rounded and includes an aspheric curve. The curve is steeper on the front surface at the bottom. As such, the bifocal correction is placed on the front surface. Different molds are used for different add powers. The back surface of the lens is also rounded and is machined to provide any necessary distance correction. As such, correction at any portion comprises a combination of the base correction and the add power.

As will be apparent to one skilled in the art, with such a typical lens, actual front curvature changes from top to bottom. This is due to the use of the aspheric front surface. This aspect is not illustrated in the cross section views of FIGS. 3A–3D. Instead, these cross sections ignore such aspheric curves to particularly illustrate that there is no additional base in prism added to the lenses from one cross-section view to another.

Figure 4:
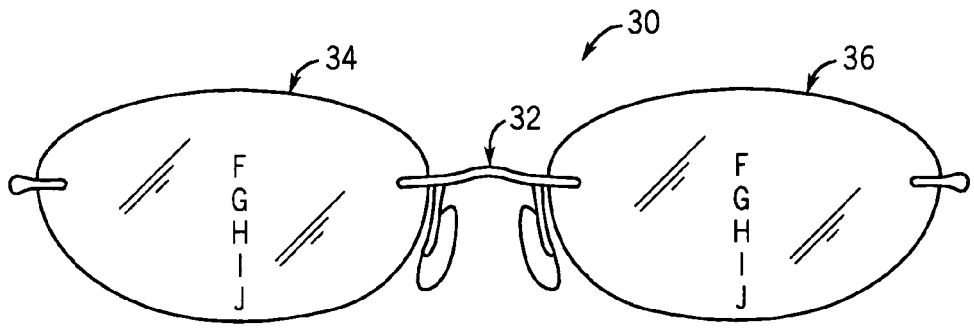
FIG. 4 is a front elevation view of eyeglasses including progressive addition lenses in accordance with the invention.

Referring to FIG. 4, a prior art pair of glasses 30 comprises a frame 32 supporting a first progressive addition lens 34 and a second progressive addition lens 36, both in accordance with the invention. As is known, each lens can have a base diopter power used for any necessary distance correction. The locations referenced as F, G, H, I and J represent add power and horizontal prism provided by the progressive surface as follows:

| Location | Add Power | Horizontal prism |
|----------|-----------|------------------|
| F | +0.00 | 0.00 Base In |
| G | +0.50 | 0.25 Base In |
| H | +1.00 | 0.75 Base In |
| I | +1.50 | 1.00 Base In |
| J | +2.00 | 1.50 Base In |

Figure 5:
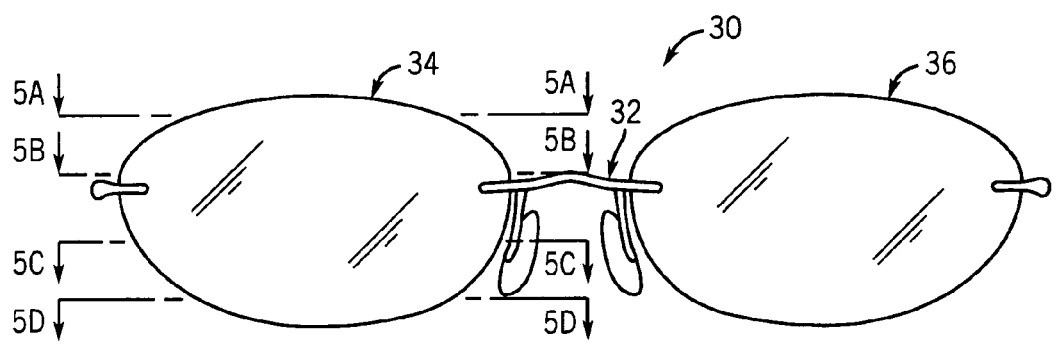
FIG. 5 is a front elevation view similar to FIG. 4 with section lines schematically illustrating lens configuration in the section views FIGS. 5A–5D.
Figure 5A:
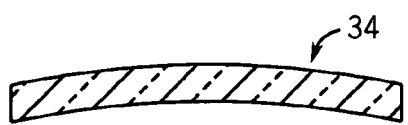
Figure 5B:
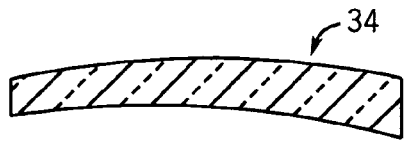
Figure 5C:
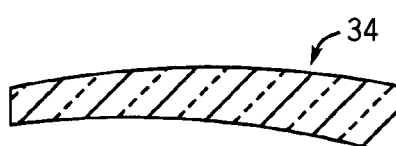
Figure 5D:
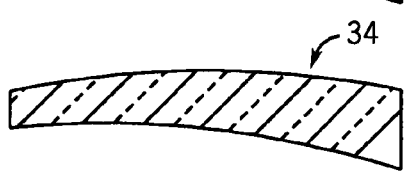

FIG. 5 illustrates the same glasses 30 as in FIG. 5 and provides cross-section lines for FIGS. 5A, 5B, 5C and 5D schematically illustrating the additional base in prism added to the lens as the bifocal add power of the lens changes. As above, these cross sections ignore aspheric curves to particularly illustrate that there is additional base in prism added to the lenses from one cross-section view to another.

Particularly, these cross-sectional views in FIGS. 5A–5D schematically illustrate the increase in base in prism, represented by an increase in curvature on one side of the lens, and thus increase in thickness, going downward in the lens as though it is added to the back surface of the lens. As will be apparent to those skilled in the art, the base in prism is not necessarily added by the change in curvature as illustrated. Instead, this is illustrated schematically to compare the cross-sections of FIGS. 5A–5D relative to FIGS. 3A–3D to illustrate the gradually increasing base in prism. Alternatively, base in prism may be induced by resultant prism which occurs by de-centering the optical center of the lens rather than increasing the thickness of the lens.

The amount of base in prism in each lens 34 and 36 would likely be the same, but could be different.

Figure 6:
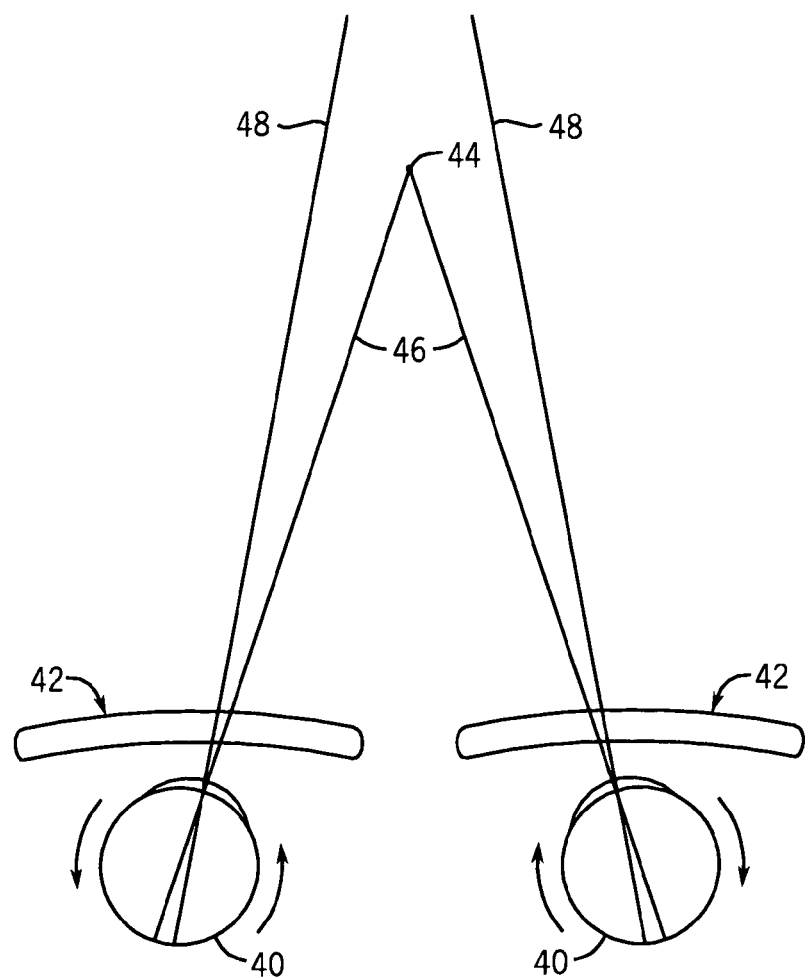
FIG. 6 is a generalized diagram illustrating difference between use of the lenses of FIG. 2 and the lenses of FIG. 4.

FIG. 6 illustrates the effect of base in prism comparing the effects of the lenses of FIG. 2 to the lenses of FIG. 4. Particularly a lens 42 is positioned in front of each eye 40 using near vision to focus on a point 44. The lines 46 which meet at the point 44 represent eye direction with normal near eye convergence. This illustrates how an object would be viewed through the prior art progressive addition lenses. The two lines 48 which do not meet at the point 44, show the eye direction when base in prism is placed before the eyes 40. These eyes are turned outwardly more, as represented by the arrows, as they do not have to converge as much to look at the same object represented by the point 44. Instead, the base in prism deflects the image so that while the eyes are aligned with the lines 48, the lenses 42 cause the eyes to see the point 44. This prismatic correction makes it appear to the user that the eyes are converging, i.e., turning in, without having to work to do this.

The lenses in accordance with the invention may be fabricated by any conventional methods and all known materials suitable for production of ophthalmic lenses. Such materials can include all glass, polycarbonate, polymethylcrylate, and other high index materials. Further, the lenses may be produced by any suitable techniques including but not limited to grinding, casting, laminating, surface casting, thermoforming, or a combination thereof.

While the present invention is specifically described with respect to a multifocal ocular lens in the form of progressive addition lenses, the concepts of the invention can be applied to non-progressive lenses, such as bifocals or trifocals.

Thus, in accordance with the invention, there is provided a multifocalicular ocular lens in which base in prism is greater in a near portion than in a distance portion or, alternatively, where base in prism continually changes between a distance portion and a near portion consistent with changes in diopter power.

I claim:

1. In a progressive addition lens comprising a distance portion and a near portion, wherein diopter power gradually increases from the distance portion to the near portion, the improvement comprising base in prism in the lens, wherein amount of base in prism increases from the distance portion to the near portion.

2. The improvement of claim 1 wherein amount of base in prism varies in a range of about 0 to 1.5 diopters.

3. The improvement of claim 1 wherein base in prism is induced by changing thickness of the lens in different amounts from the distance portion to the near portion.

4. The improvement of claim 1 wherein base in prism is induced by de-centering optical center of the lens in different amounts from the distance portion to the near portion.

5. A progressive addition lens comprising a distance portion, an intermediate portion and a near portion, wherein diopter power and base in prism continually change in the intermediate portion between the distance portion and the near portion.

6. The progressive addition lens of claim 5 wherein amount of base in prism varies in a range of about 0 to 1.5 diopters.

7. The progressive addition lens of claim 5 wherein base in prism is induced by changing thickness of the lens in different amounts in the intermediate portion between the distance portion and the near portion.

8. The progressive addition lens of claim 5 wherein base in prism is induced by de-centering optical center of the lens in different amounts in the intermediate portion between the distance portion and the near portion.

9. A pair of glasses comprising:
a frame;
a first progressive addition lens in the frame comprising a distance portion and a near portion, wherein diopter power and base in prism gradually increase from the distance portion to the near portion; and
a second progressive addition lens in the frame comprising a distance portion and a near portion, wherein diopter power and base in prism gradually increase from the distance portion to the near portion.

10. The pair of glasses of claim 9 wherein amount of base in prism in each lens varies in a range of about 0 to 1.5 diopters.

11. The pair of glasses of claim 9 wherein base in prism in each lens is induced by changing thickness of the lens in different amounts between the distance portion and the near portion.

12. The pair of glasses of claim 9 wherein base in prism in each lens is induced by de-centering optical center of the lens in different amounts between the distance portion and the near portion.

13. The pair of glasses of claim 9 wherein amount of base in prism in the first lens is different from in the second lens.

14. A progressive addition lens comprising a distance portion, an intermediate portion and a near portion, wherein diopter power continually changes in the intermediate portion between the distance portion and the near portion and wherein base in prism is greater in the near portion than in the distance portion.

15. The progressive addition lens of claim 14 wherein difference in amount of base in prism between the near portion and the distance portion is at least 0.5 diopters.

16. The progressive addition lens of claim 14 wherein amount of base in prism varies in a range of about 0 to 1.5 diopters.

17. The progressive addition lens of claim 14 wherein amount of base in prism varies in a range of about 0 to 3 diopters.

18. A bifocal lens comprising a distance portion and a near portion, wherein diopter power is greater in the near portion than in the distance portion and wherein base in prism is greater in the near portion than in the distance portion.

19. The bifocal lens of claim 18 wherein difference in amount of base in prism between the near portion and the distance portion is at least 0.5 diopters.

20. The bifocal lens of claim 18 wherein amount of base in prism varies in a range of about 0 to 1.5 diopters.

21. The bifocal lens of claim 18 wherein amount of base in prism varies in a range of about 0 to 3 diopters.

* * * * *